April 24, 1962    R. N. MINOR ET AL    3,030,850
DEFORMABLE HOLLOW RIVET AND PIN
Filed May 22, 1959

INVENTORS
FRANCIS W. STAGER,
ROBERT N. MINOR
BY & THOMAS A. MINOR

McMorrow, Berman & Davidson
ATTORNEYS

United States Patent Office 3,030,850
Patented Apr. 24, 1962

3,030,850
DEFORMABLE HOLLOW RIVET AND PIN
Robert N. Minor and Thomas A. Minor, both of Rte. 2, Rockville, Conn., and Francis W. Stager, Stafford Springs, Conn.; said Stager assignor to said Robert N. Minor and said Thomas A. Minor
Filed May 22, 1959, Ser. No. 815,141
1 Claim. (Cl. 85—40)

The present invention relates to rivets generally and in particular to blind rivets which may be expanded into clinching position without requiring access to both ends of the rivet.

Presently employed in a large number of industries, particularly the aircraft industry, are blind rivets for securing two or more superposed plate members or sheet members together, where access to only one face of the plate or sheet members is possible. Such blind rivets must have their one ends expanded into clinching engagement with the other face of the plate or sheet members. Generally, inspection of the expanded ends of the rivets is not practical and therefore positive means for expanding the rivets must be employed in order that each rivet be expanded to the position of optimum clinching performance.

An object of the present invention is to provide a rivet having positive expanding means for securing two or more superimposed plate members together in a highly efficient manner.

Another object of the present invention is to provide a rivet having interlocking relatively movable elements which cannot be displaced from alignment with each other prior to clinching or expansion of the rivet blind end.

A further object of the present invention is to provide a rivet in two parts so related that separation of the parts of the rivet is impossible after expansion of the blind end of the rivet, thus obviating the necessity for inspection of the blind end of the rivet after clinching, one which lends itself to manufacture in quantity at reasonable cost, one which may be manufactured in any diameter or length and for any purpose found practical, and one which is highly effective in action.

These and other objects and advantages of the present invention will be fully apparent from the following description when taken in conjunction with the annexed drawing, in which.

Figure 1:
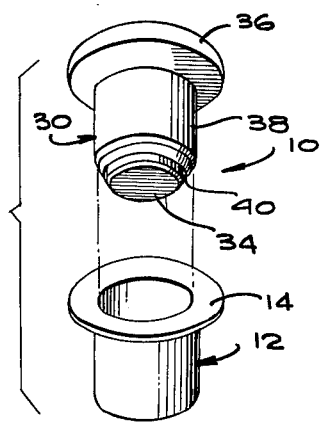
FIGURE 1 is an isometric expanded view of the two part rivet according to the present invention.
Figure 2:
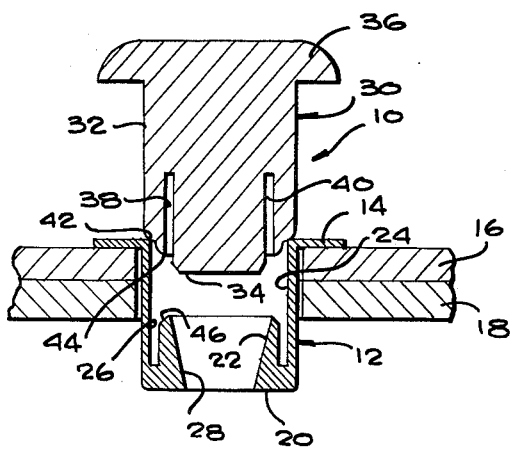
FIGURE 2 is a sectional view of the rivet of the present invention shown with one part inserted in a hole in a pair of superimposed plates and with the other part in position prior to entering the first part.

Referring in greater detail to the drawing in which like numerals indicate like parts throughout the several views, the rivet of the present invention is designated generally by the reference numeral 10 and comprises a sleeve 12 having means, embodying a flange 14 on one end adapted to bear against one face of a pair of plates 16 and 18 which are arranged in superimposed relation, as shown most clearly in FIGURE 2.

A deformable hollow spreader member 20 bridges the end of the sleeve 12 remote from the flange 14 and is formed integrally therewith and secured thereto. The member 20 has a portion 22 extending inwardly from the end of the sleeve 12 remote from the flange 14. The portion 22 terminates at a point adjacent to and spaced from the end of the sleeve 12 remote from the flange 14.

The perimeter of the portion 22 of the spreader member 20 is spaced from the inner wall 24 of the sleeve 12 and forms an encompassing slot 26 opening toward the end of the sleeve 12 having the flange 14 thereon.

The portion 22 of the spreader member 20 surrounded by the slot 26 forms a skirt.

The spreader member 20 is provided with a frusto-conical bore 28 extending through the spreader member 20 from the outer face to the inner face. The bore 28 has its larger end within the sleeve 12 and facing toward the skirt portion 22. The larger end of the bore 28 also faces toward the end of the sleeve 12 having a flange 14.

The small end of the bore 28 is adjacent the end of the sleeve 12 remote from the flange 14. The skirt or skirt portion 22 is axially arranged with respect to the sleeve 12 and projects inwardly from the end of the sleeve 12 remote from the flange 14.

The rivet includes a deformable pin or pin element 30 having a shank 32 provided with a nose 34 on one end thereof. The shank 32 is provided with a head 36 on the end remote from the nose 34.

The shank 32 is provided with an encircling ring 38 formed by an encircling opening 40 extending inwardly from the end having the nose 34 and terminating at a point adjacent to and spaced from the end having the head 36.

The opening 40 subdivides the part of the shank 32 confined within the opening 40 into the nose 34, the part of the shank 32 surrounding the opening 40 being the ring 38.

The free end portion of the ring 38 on the shank 32 is rounded at two points 42 and 44 and the free edge of the skirt or skirt portion 22 of the spreader member 20 is beveled, as at 46 in FIGURE 2.

It is to be noted that the shank 32 is of a diameter slightly larger than the internal diameter of the sleeve 12, the ring 38 is of a diameter slightly smaller than the skirt 22 or slot 26, and the nose 34 is of a diameter slightly larger than the internal diameter of the spreader member or its bore 28.

Figure 3:
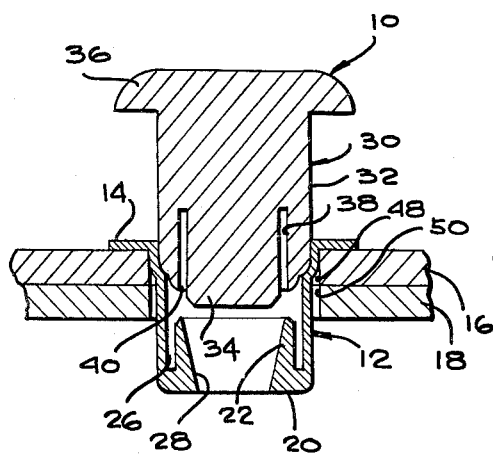
FIGURE 3 is a view in section showing the initial step of expanding the blind end of the rivet of the present invention.

In use, the rivet 10 is used to secure the superimposed plates 16 and 18 together, and first, the superimposed plates 16 and 18 are provided with aligned holes therethrough as designated by the numerals 48 and 50 in FIGURE 3. The sleeve 12 is inserted into the holes 48 and 50 and is of a size to loosely fit within such holes. The pin element 30 is inserted into the sleeve 12 by projecting the nose 34, the opening 40, and the ring 38 through the end of the sleeve 12 having the flange 14 so that the nose 34 is in registry with the bore 28, the opening 40 is in registry with the skirt or skirt portion 22, and the ring 38 is in registry with the slot 26.

Upon the application of a striking or compressive force to the head 36 of the pin element 30, the portion of the sleeve 12 inwardly of the flange 14 is swaged outwardly into tight sealing engagement with the wall of the holes 48 and 50, as shown in FIGURE 3.

Figure 4:
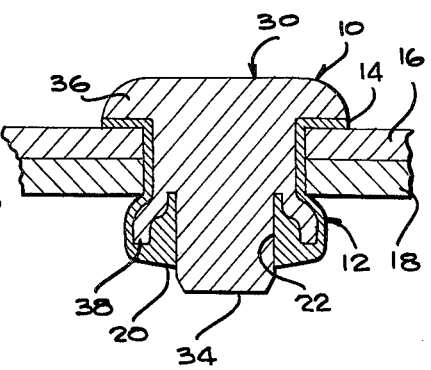
FIGURE 4 is a view in section showing the rivet of the present invention in completed expanded position.

Upon the application of a further striking or compressive force of a magnitude such as to shift the head 36 of the element 30 into tight sealing engagement on the flange 14, the ring 38 enters the slot 26, the nose 34 enters the bore 28, and the skirt or skirt portion 22 enters the opening 40. This results in effecting the expansion of the spreader member 20 to the position or condition shown in FIGURE 4 in which the portion of the sleeve 12 exteriorly of the plate 18 is clinched about the edge of the hole 50. This clinching of the sleeve 12 on the plate 18 is accompanied by spreading of the ring 38 outwardly and into a position backing up the adjacent portion of the sleeve 12.

It will be seen therefore that the rivet 10 when in the clinching position tightly seals the holes 48 and 50 in the plates 16 and 18, respectively, and securely fixes the plates 16 and 18 together.

What is claimed is:

A rivet comprising a sleeve having means embodying a flange at one end adapted to bear against one face of a pair of superimposed plates to be riveted together, a deformable hollow spreader member bridging the other end of said sleeve and secured thereto, said member having a skirt portion extending axially inwardly from the other end and terminating at a point spaced from said one end and having its perimeter spaced radially inwardly from the inner wall of said sleeve to form a circumferential encompassing slot opening toward said sleeve one end surrounding said skirt portion, there being a frusto-conical bore extending through said spreader member, said bore having the larger end thereof within the terminal end of said skirt and having the smaller end remote from said skirt's terminal end, and a deformable pin element including a shank and an enlarged head on one end of said shank, said shank being provided with an encircling circumferential opening extending inwardly from the other end of said pin and terminating at a point intermediate said ends and subdividing the part of said shank confined within said opening into a nose and the part of said shank surrounding said opening into a ring-like portion, said shank being of a diameter slightly larger than the internal diameter of said sleeve, said ring-like portion having an internal diameter slightly smaller than the external diameter of said skirt portion, and said nose being of a diameter slightly larger than said smaller end of said frusto-conical bore and slightly smaller than said larger end of said bore, said pin element being inserted into said sleeve by projecting the nose, the circumferential opening, and ring-like portion through said sleeve one end into registry with and in engagement with the larger end of said frusto-conical bore, the skirt, and encompassing slot respectively, the ring, the spreader element, the skirt and sleeve being deformed to clinching position with respect to the other face of said pair of plates upon application of a force directed to the head of said pin element of a magnitude sufficient to eject said head into abutting engagement with said flange.

References Cited in the file of this patent

UNITED STATES PATENTS

| | | |
|---|---|---|
| 487,778 | Sanders | Dec. 13, 1892 |
| 554,949 | Nikoloff | Feb. 18, 1896 |
| 638,564 | Davies | Dec. 5, 1899 |
| 2,065,333 | Kirley | Dec. 22, 1936 |
| 2,125,552 | Feldhoff | Aug. 2, 1938 |
| 2,264,747 | Fether | Dec. 2, 1941 |
| 2,328,023 | Lang | Aug. 31, 1943 |
| 2,358,578 | Keehn | Sept. 19, 1944 |

FOREIGN PATENTS

| | | |
|---|---|---|
| 57,181 | Norway | Oct. 19, 1936 |
| 86,411 | Norway | Sept. 3, 1955 |